United States Patent [19]

Guenther

[11] 4,415,141

[45] Nov. 15, 1983

[54] WALL BAR

[75] Inventor: Torbett B. Guenther, Plymouth, Mich.

[73] Assignee: C. D. Sparling Company, Plymouth, Mich.

[21] Appl. No.: 385,914

[22] Filed: Jun. 7, 1982

[51] Int. Cl.³ .......................................... E04F 11/18
[52] U.S. Cl. .................................... 256/69; 403/198; 403/262; 248/125
[58] Field of Search ........................ 256/69, 65, 59; 248/251; 16/125; 403/198, 262, 23; 4/576, 577, 511, 611

[56] References Cited

U.S. PATENT DOCUMENTS

| | | | |
|---|---|---|---|
| 2,319,254 | 5/1943 | Neunherz | 403/262 |
| 3,098,240 | 7/1963 | Fleenor | 248/251 X |
| 3,183,549 | 5/1965 | Hammesfahr | 16/125 |
| 3,193,228 | 7/1965 | Chion | 256/69 |
| 3,429,558 | 2/1969 | Burmann et al. | 256/65 |
| 3,633,862 | 1/1972 | Breen | 256/65 X |
| 4,193,586 | 3/1980 | Guenther | 256/69 |

Primary Examiner—Andrew V. Kundrat
Attorney, Agent, or Firm—Barnes, Kisselle, Raisch, Choate, Whittemore & Hulbert

[57] ABSTRACT

A wall bar comprising a length of tubular material the ends of which said length extend at an angle to the adjacent portions. The ends have integral flattened portions lying in a plane intersected by the inclined portions and defining an obtuse angle with the axis of the inclined portions. The flattened portions are adapted to engage a wall and be attached thereto. A cover plate is provided for each end and has an elongated opening such that the cover plate may be telescoped over the flattened portion to mount the plate on the bar after the flattened portion has been formed and the plate can be placed in position over the flattened portion after the flattened portion has been attached to a wall.

14 Claims, 14 Drawing Figures

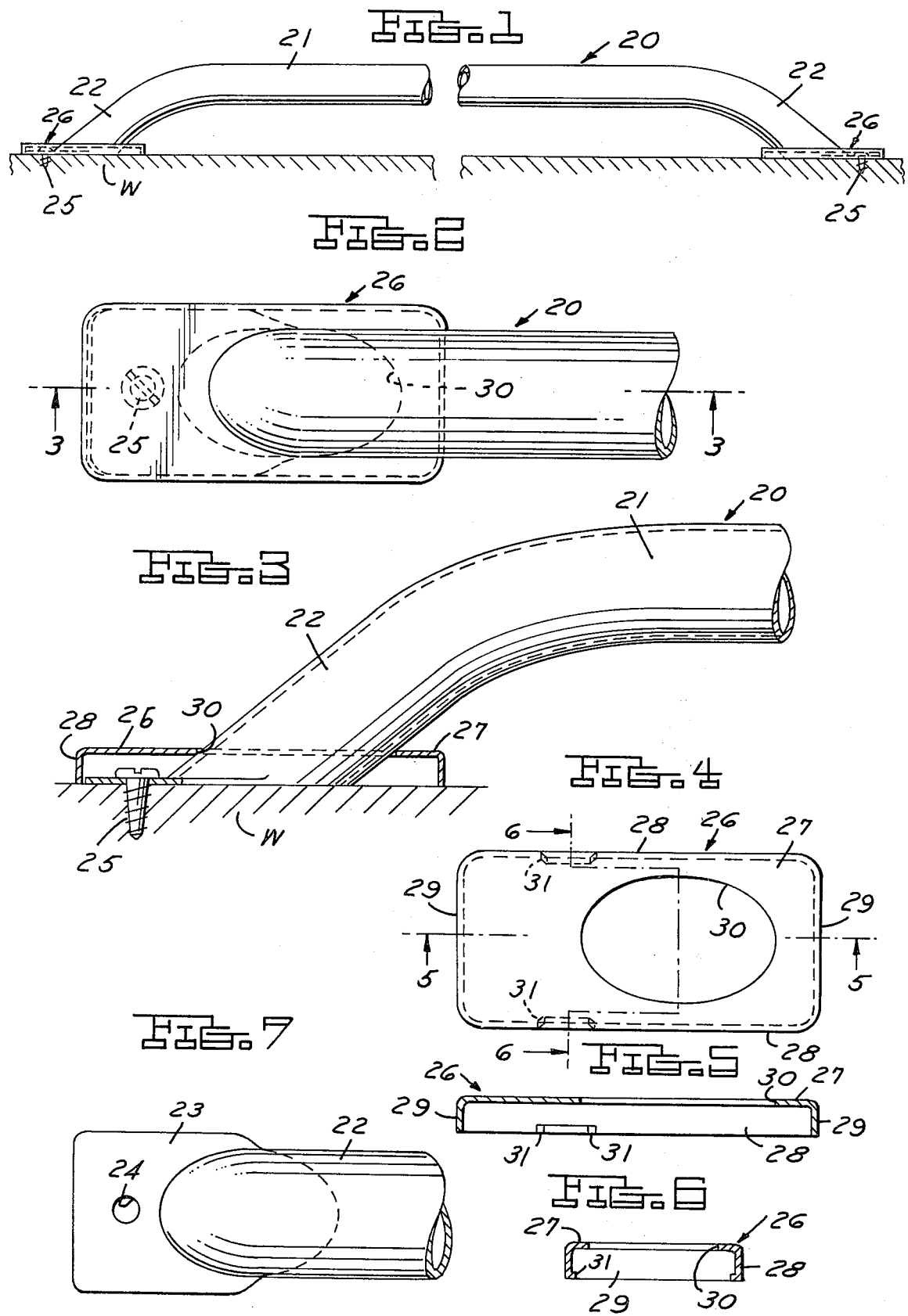

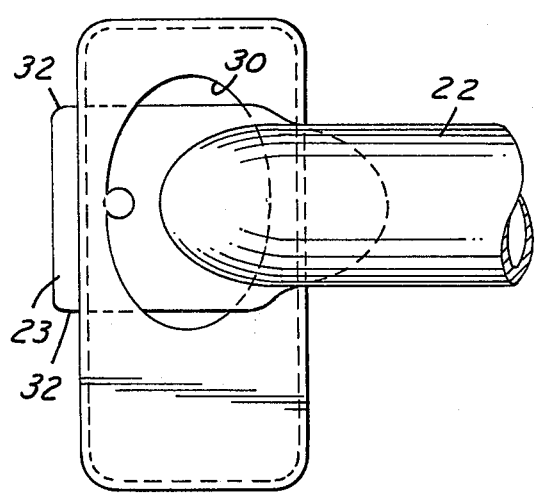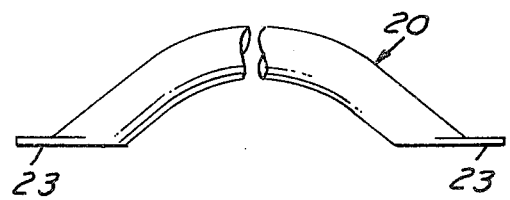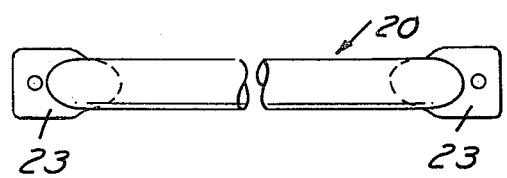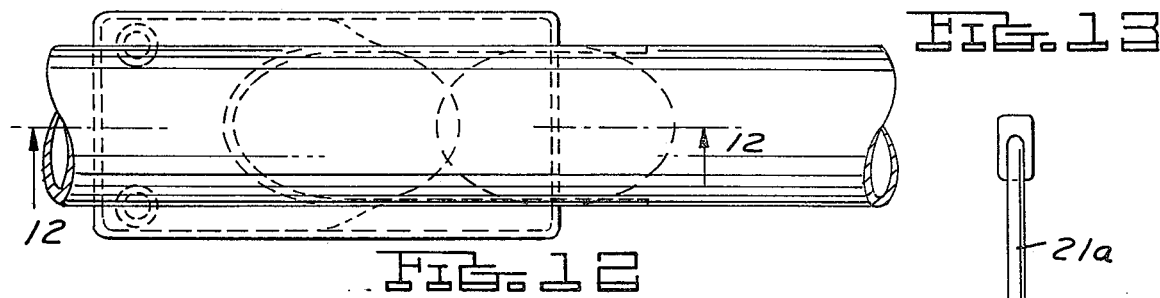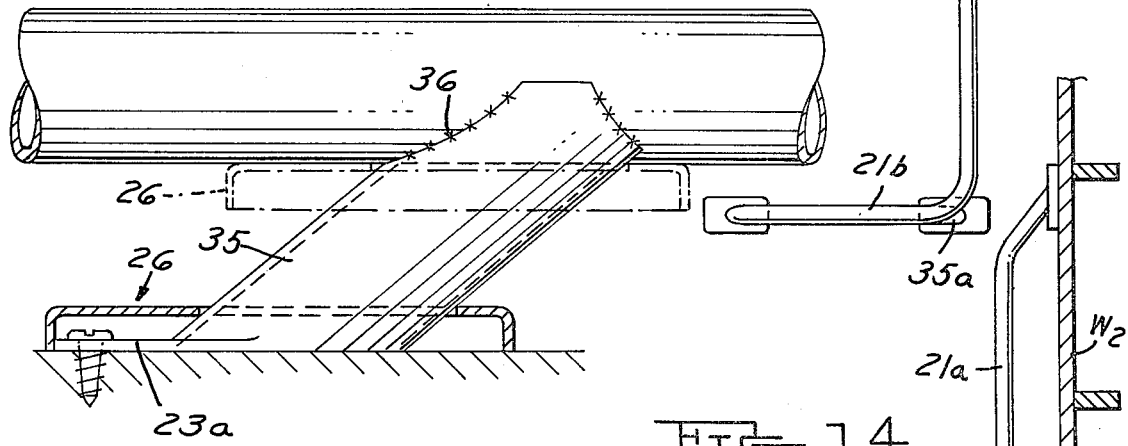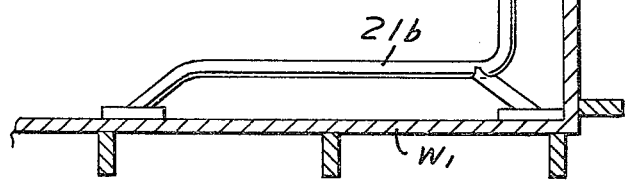

WALL BAR

This invention relates to wall bars or hand rails.

BACKGROUND AND SUMMARY OF THE INVENTION

In order to permit the elderly and disabled to move about, it has been common to provide wall bars or hand rails. Such bars are fastened to the wall and must be sufficiently strong to withstand the weight that is applied thereto.

In one common type of wall bar, the bar includes a length of tubular material and mounting flanges such as stampings are mechanically connected or welded to the bar for attachment to the wall. Cover plates are usually mounted on the bar prior to fastening the stampings. Where necessary, it is also common to utilize intermediate supports along the length of the bar. Such a construction is not only costly but involves the use of substantially more materials.

Among the objectives of the present invention are to provide a wall bar that is less expensive, utilizes less tubing to span a given area, is of such construction that the cover plates can be applied after the bar has been formed with flanges; and which utilizes an intermediate support that permits the bar to be mounted and have greater strength in situations such as where the bar is applied to wall portions forming an angle to one another.

In accordance with the invention, the wall bar comprises a length of tubular material having ends extending at an angle to the adjacent portions. The ends have integral flattened portions lying in a plane intersected by the inclined portions and defining an obtuse angle with the axis of the inclined portions. The flattened portions are adapted to engage a wall and be attached thereto. A cover plate is provided for each end and has an elongated opening such that the cover plate may be telescoped over the flattened portion to mount the plate on the bar after the flattened portion has been formed and the plate can be placed in position over the flattened portion after the flattened portion has been attached to a wall.

DESCRIPTION OF THE DRAWINGS

FIG. 1 is a fragmentary plan view of a wall bar embodying the invention.

FIG. 2 is a fragmentary side elevational view on an enlarged scale of a portion of the bar.

FIG. 3 is a fragmentary part sectional plan view taken along the line 3—3 in FIG. 2.

FIG. 4 is a plan view of a cover plate.

FIG. 5 is a sectional view taken along the line 5—5 in FIG. 4.

FIG. 6 is a sectional view taken along the line 6—6 in FIG. 4.

FIG. 7 is a fragmentary side elevational view of a portion of the bar prior to assembly.

FIG. 8 is a fragmentary view similar to FIG. 7 showing the mounting of the cover plate on the end of the bar.

FIG. 9 is a fragmentary plan view of a bar prior to attachment of the cover plate.

FIG. 10 is a fragmentary side elevational view of a bar prior to attachment of the cover plate.

FIG. 11 is a fragmentary side elevational view of a modified bar having an intermediate support.

FIG. 12 is a fragmentary part sectional view taken along the line 12—12 in FIG. 11.

FIG. 13 is a fragmentary side elevational view of a modified form of bar.

FIG. 14 is a fragmentary plan view of the bar shown in FIG. 13 mounted on a wall.

DESCRIPTION

Referring to FIG. 1, the wall bar 20 embodying the invention comprises a length of tubular material such as metal which as shown includes an intermediate straight portion 21 and end portions 22 having their axes at an obtuse angle to the axis of the portion 21. In accordance with the invention, the free ends of the portions 22 are flattened to form integral portions 23 that are generally rectangular and define a plane that is intersected at an acute angle by the axes of the inclined portions 22. Each flattened portion 23 includes an opening 24 whereby it can be attached to a wall W by a screw 25 extending through the opening 24.

A separate cover plate 26 such as shown in FIGS. 4–6 is provided for each flattened portion 23 and comprises a planar portion 27, side walls 28, and end walls 29. The cover plate 26 is adapted to be mounted on each end after the ends 23 are flattened. In order that this can be done, each cover plate is provided with an elongated opening 30 that is elliptical in the planar portion 27, the long dimension of the opening 30 being greater than the width of the flange 23 so that the cover plate can be mounted on the bar by passing the flange 23 through the opening 30 (FIG. 8). After the bar is fastened by the screws 25, the plates 30 can then be rotated 90° to bring the side walls 26 into frictional engagement with the sides of the flanges 23. Tabs 31 can be provided to frictionally engage the sides 32 of the flange and hold the cover plate in position.

Referring to FIGS. 11 and 12, in some instances where the length of the bar is long, it is desirable to provide intermediate support. In accordance with the invention, this is achieved by a tubular intermediate support 35 that is fastened at one end to the tube as by welding at 36 and has its other end formed with a flange 23a similar to the flange 23.

As previously described, the cover plate 26 is telescoped onto the intermediate support 35 and then the flange portion 23a is fastened to the wall after which the cover plate is moved into position overlying the flange portion 23a.

The intermediate support 35 forms an acute angle with the axis of the intermediate portion of the tube. Such an arrangement has particular utility where the bar has angular portions 21a, 21b and is adapted for attachment to wall portions $W_1$, $W_2$ at an acute angle as shown in FIGS. 13 and 14. In such an arrangement, the intermediate support 35a lies in a common plane with one end of one bar portion 21b and extends at an obtuse angle to the portion 21b in close proximity to the wall portions thereby taking advantage of the greater strength of the wall portions at the area of juncture.

What is claimed is:

1. A wall bar comprising
   a length of tubular material,
   the ends of said length extending at an angle to the adjacent portions,
   said ends having integral flattened portions lying in a plane intersected by the inclined portions and defining an obtuse angle with the axis of the inclined portions, said flattened portions being adapted to engage a wall and be attached thereto, a cover plate for each end, each said cover plate having an elongated opening which has a long axis having a dimension greater than the width of the flattened portion such that the cover plate may be telescoped over the flattened portion to mount the plate on the bar after the flattened portion has been formed and the plate can be placed in position over the flattened portion after the flattened portion has been attached to a wall.

2. The wall bar set forth in claim 1 wherein said opening in each cover plate is elliptical and has a long axis having a dimension greater than the width of the flattened portion so that the cover plate can be telescoped over the flattened portion and then rotated 90° to be aligned with the flattened portion.

3. The wall bar set forth in claim 2 wherein each said cover plate includes side walls engaging the sides of the flattened portion.

4. The wall bar set forth in claim 3 wherein each said cover plate includes end portions extending toward the wall.

5. The wall bar set forth in claim 1 including an intermediate support comprising a tubular portion having one end fixed to the wall bar and extending at an cute angle to the axis of the portion of the bar to which the intermediate portion is attached, the other end of said intermediate support being flattened and adapted to engage a wall.

6. The wall bar set forth in claim 5 including an additional cover plate, said additional cover plate having an elongated opening such that the cover plate may be telescoped over the flattened portion of the intermediate support to mount the plate on the bar after the flattened portion of the intermediate support has been formed and the plate can be placed in position over the flattened portion after the flattened portion of the intermediate support has been attached to a wall.

7. The wall bar set forth in claim 6 wherein said opening in said additional cover plate is elliptical and has a long axis having a dimension greater than the width of the flange of said intermediate support so that the cover plate can be telescoped over the flange and then rotated 90° to be aligned with the flange.

8. The wall bar set forth in claim 5 wherein said bar includes portions intermediate the ends that have their axes forming an angle to one another, said intermediate support being attached to one of said portions and extending at an obtuse angle to said portion and one end of one of said bar portions and said intermediate support lying in a common plane such that the flattened portion of said intermediate support may be closely positioned to the area of juncture of the two wall portions.

9. A building construction comprising a wall, a wall bar comprising a length of tubular material, the ends of said length extending at an angle to the adjacent portions, said ends having integral flattened portions lying in a plane intersected by the inclined portions and defining an obtuse angle with the axis of the inclined portions, said flattened portions being fastened to said wall, a cover plate for each end, each said cover plate having an elongated opening which has a long axis having a dimension greater than the width of the flattened portion such that the cover plate may be telescoped over the flattened portion to mount the plate on the bar after the flattened portion has been formed and the plate can be placed in position over the flattened portion after the flattened portion has been attached to a wall.

10. The wall bar set forth in claim 9 wherein said opening in each cover plate is elliptical and has a long axis having a dimension greater than the width of the flattened portion so that the cover plate can be telescoped over the flattened portion and then rotated 90° to be aligned with the flattened portion.

11. The wall bar set forth in claim 10 wherein each said cover plate includes side walls engaging the sides of the flattened portion.

12. The wall bar set forth in claim 11 wherein said cover plate includes end portions extending toward the wall.

13. The wall bar set forth in claim 9 including an intermediate support comprising a tubular portion having one end fixed to the wall bar and extending at an acute angle to the axis of the portion of the bar to which the intermediate portion is attached, the other end of said intermediate support being flattened and fastened to said wall.

14. The wall bar set forth in claim 13 wherein said wall including two wall portions at an angle to one another, said bar including bar portions intermediate the ends that have their axes forming an angle to one another, said intermediate support being attached on one of said portions and extending at an obtuse angle to said portion and one end of one of said bar portions and said intermediate plane such that the flattened portion of said intermediate support may be closely positioned to the area of juncture of the two wall portions.

* * * * *